United States Patent
Noda

(10) Patent No.: US 12,180,109 B2
(45) Date of Patent: Dec. 31, 2024

(54) METHOD FOR MANUFACTURING GLASS SHEET, AND GLASS SHEET AND GLASS SHEET ASSEMBLY

(71) Applicant: Nippon Electric Glass Co., Ltd., Shiga (JP)

(72) Inventor: Takayuki Noda, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 413 days.

(21) Appl. No.: 17/602,473

(22) PCT Filed: Apr. 3, 2020

(86) PCT No.: PCT/JP2020/015416
§ 371 (c)(1),
(2) Date: Oct. 8, 2021

(87) PCT Pub. No.: WO2020/217936
PCT Pub. Date: Oct. 29, 2020

(65) Prior Publication Data
US 2022/0204393 A1 Jun. 30, 2022

(30) Foreign Application Priority Data

Apr. 23, 2019 (JP) ................................. 2019-081851

(51) Int. Cl.
*B23K 26/402* (2014.01)
*C03C 15/00* (2006.01)
(Continued)

(52) U.S. Cl.
CPC ............ *C03C 15/00* (2013.01); *B23K 26/402* (2013.01); *C03C 23/0025* (2013.01); *B23K 2103/54* (2018.08)

(58) Field of Classification Search
CPC .. B23K 26/402; B23K 26/0622; B23K 26/53; B23K 2103/54; C03C 15/00; C03C 23/0025

See application file for complete search history.

(56) References Cited

U.S. PATENT DOCUMENTS

| 2003/0150839 A1 | 8/2003 | Kobayashi et al. |
| 2006/0127640 A1 | 6/2006 | Kobayashi et al. |

(Continued)

FOREIGN PATENT DOCUMENTS

| JP | 2003-226551 | 8/2003 |
| JP | 2006-290630 | 10/2006 |

(Continued)

OTHER PUBLICATIONS

International Preliminary Report on Patentability and Written Opinion of the International Searching Authority issued Sep. 28, 2021 in International (PCT) Application No. PCT/JP2020/015416.

(Continued)

*Primary Examiner* — Monica A Huson
(74) *Attorney, Agent, or Firm* — Wenderoth, Lind & Ponack, L.L.P.

(57) ABSTRACT

Provided is a method of manufacturing a glass sheet having a through hole, including: a first step of preparing a glass sheet (1); and a second step of forming a through hole (2) in the glass sheet (1), wherein the first step includes, under conditions of: θ representing an inclination angle of an inner wall surface (2a) of the through hole (2) with respect to a sheet thickness direction; D representing a minimum hole width of the through hole (2); and an allowable variation range of the minimum hole width D being represented by A % of the minimum hole width D, preparing the glass sheet (1) for which a sheet thickness variation range ΔT satisfies the following relationship when the through hole (2) is (Continued)

gradually widened toward only one side of the sheet thickness direction: $\Delta T \leq (D \times A / \tan \theta)/200$.

13 Claims, 2 Drawing Sheets

(51) Int. Cl.
    *C03C 23/00*     (2006.01)
    *B23K 103/00*     (2006.01)

(56) References Cited

U.S. PATENT DOCUMENTS

| | | |
|---|---|---|
| 2016/0347643 A1 | 12/2016 | Yamauchi et al. |
| 2017/0088457 A1 | 3/2017 | Mori |
| 2017/0103249 A1 | 4/2017 | Jin et al. |
| 2017/0295652 A1 | 10/2017 | Isobe |
| 2018/0037489 A1 | 2/2018 | Ono |
| 2018/0317319 A1 | 11/2018 | Mori et al. |
| 2019/0012514 A1 | 1/2019 | Jin et al. |
| 2019/0021170 A1 | 1/2019 | Isobe et al. |
| 2020/0009691 A1 | 1/2020 | Ostholt et al. |

FOREIGN PATENT DOCUMENTS

| | | |
|---|---|---|
| JP | 2016-222529 | 12/2016 |
| JP | 2017-61401 | 3/2017 |
| JP | 2017-190285 | 10/2017 |
| JP | 2018-24571 | 2/2018 |
| JP | 2018-531205 | 10/2018 |
| JP | 2018-188351 | 11/2018 |
| JP | 2019-21916 | 2/2019 |
| WO | 2017/062798 | 4/2017 |
| WO | 2018/162385 | 9/2018 |

OTHER PUBLICATIONS

International Search Report issued Jun. 30, 2020 in International (PCT) Application No. PCT/JP2020/015416.

METHOD FOR MANUFACTURING GLASS SHEET, AND GLASS SHEET AND GLASS SHEET ASSEMBLY

TECHNICAL FIELD

The present invention relates to a method of forming, in a glass sheet, a through hole gradually widened toward at least one side of a sheet thickness direction, and to a glass sheet for forming such through hole.

BACKGROUND ART

In recent years, a glass sheet having a through hole has been used as a substrate for an electronic device or the like. As the glass sheet of this kind, in each of Patent Literatures 1 and 2 below, there is a disclosure of a glass sheet having formed therein a tapered through hole gradually widened in diameter toward one side of a sheet thickness direction.

Specifically, in Patent Literature 1, there are disclosures of a glass sheet having a curved surface formed between a principal surface of the glass sheet and an inner wall surface of its tapered through hole, and a method of manufacturing the same. In addition, in Patent Literature 2, there is a disclosure that a glass sheet is irradiated with a laser from one principal surface side thereof to form a tapered through hole, and then an etchant is sprayed toward the through hole from the other principal surface side of the glass sheet.

CITATION LIST

Patent Literature 1: JP 2003-226551 A
Patent Literature 2: JP 2016-222529 A

SUMMARY OF INVENTION

Technical Problem

Incidentally, when a tapered through hole is formed in a glass sheet, the minimum hole width (minimum hole diameter) of the through hole serves as an important factor in determining whether or not the glass sheet with the hole is of good quality. In this case, when the sheet thickness of the glass sheet differs, along with this, the minimum hole width of the through hole also differs. Accordingly, a variation in sheet thickness of the glass sheet adversely affects a variation in minimum hole width of the through hole, thereby serving as a factor in degrading the dimensional accuracy of the through hole over the entire length in the sheet thickness direction.

However, the glass sheet and the method of manufacturing the same disclosed in each of Patent Literatures 1 and 2 have no consideration for, for example, the above-mentioned relationship between the sheet thickness of the glass sheet and the minimum hole width of the through hole. Accordingly, it is difficult to form a through hole having excellent dimensional accuracy in the glass sheet.

From the above-mentioned viewpoint, an object of the present invention is to form a tapered through hole improved in dimensional accuracy in a glass sheet.

Solution to Problem

According to a first aspect of the present invention, which has been devised to achieve the above-mentioned object, there is provided a method of manufacturing a glass sheet having a through hole, comprising: a first step of preparing a glass sheet; and a second step of forming, in the glass sheet, a through hole gradually widened toward at least one side of a sheet thickness direction, wherein the first step comprises: preparing a glass sheet for which a sheet thickness variation range $\Delta T$ of the glass sheet satisfies the following relationship when the through hole is gradually widened toward only one side of the sheet thickness direction: $\Delta T \leq (D \times A/\tan \theta)/200$, or preparing a glass sheet for which the sheet thickness variation range $\Delta T$ of the glass sheet satisfies the following relationship when the through hole is gradually widened from a middle portion in the sheet thickness direction toward both of one side and another side of the sheet thickness direction: $\Delta T \leq (D \times A/\tan \theta)/100$, provided that: $\theta$ represents an inclination angle of an inner wall surface of the through hole with respect to the sheet thickness direction; D represents a minimum hole width of the through hole; and an allowable variation range of the minimum hole width D is represented by A % of the minimum hole width D. As used herein, the above-mentioned term "allowable variation range of the minimum hole width D" means an allowable difference between the maximum value and the minimum value for the minimum hole width D. In addition, the above-mentioned term "sheet thickness variation range of the glass sheet" means a difference between the maximum value and the minimum value of the sheet thickness of the glass sheet. Further, the above-mentioned inclination angle $\theta$ and minimum hole width D are each a design value (value predetermined for the formation of the through hole in the second step).

According to such method, irrespective of which of the above-mentioned two kinds the form of the through hole is, the sheet thickness variation range $\Delta T$ of the glass sheet falls within a predetermined range based on the inclination angle $\theta$ of the inner wall surface of the through hole with respect to the sheet thickness direction, the minimum hole width D of the through hole, and the allowable variation range A of the minimum hole width D. Accordingly, the variation in sheet thickness of the glass sheet is suppressed from adversely affecting the dimensional accuracy of the tapered through hole (in particular, the dimensional accuracy of the minimum hole width D). As a result, a tapered through hole improved in dimensional accuracy can be formed in the glass sheet.

In this method, a plurality of the through holes identical to each other in size and shape may be formed in a glass sheet for which the sheet thickness variation range $\Delta T$ satisfies any one of the relationships.

With such configuration, the variation in sheet thickness of the glass sheet is suppressed from adversely affecting the dimensional accuracy of each of the plurality of tapered through holes identical to each other in size and shape. As a result, the plurality of tapered through holes each improved in dimensional accuracy can be formed in the glass sheet.

In the above-mentioned method, the first step may comprise preparing a plurality of glass sheets for each of which the sheet thickness variation range $\Delta T$ satisfies any one of the relationships.

With such configuration, the sheet thickness variation range $\Delta T$ for all of the plurality of glass sheets falls within the predetermined range based on the inclination angle $\theta$ of the inner wall surface of the through hole with respect to the sheet thickness direction, the minimum hole width D of the through hole, and the allowable variation range A of the minimum hole width D. Accordingly, the variation in sheet thickness among the plurality of glass sheets can be properly suppressed, to thereby form a tapered through hole improved in dimensional accuracy in each of the plurality of glass sheets.

In the above-mentioned method, the second step may comprise forming the through hole through laser irradiation treatment for a principal surface of the glass sheet, and etching treatment for the glass sheet after the laser irradiation treatment.

With such configuration, a tapered through hole that has been finished to have good quality through the laser irradiation treatment and the etching treatment can be formed in the glass sheet.

In this method, the forming the through hole may be performed by forming an irradiation-treated region in the glass sheet through the laser irradiation treatment, and removing the irradiation-treated region through the etching treatment. The irradiation-treated region to be formed in the glass sheet through the laser irradiation treatment may be a region having a through hole, or may be a modified region having no through hole.

With such configuration, a tapered through hole having a smooth inner wall surface can be formed in the glass sheet.

In this method, the laser irradiation treatment may comprise irradiating, with a laser, a plurality of mutually separated points on an imaginary line corresponding to a contour line of an opening of the through hole on the principal surface of the glass sheet.

With such configuration, irradiation-treated regions or through holes formed through the irradiation with the laser are formed at the plurality of mutually separated sites on the imaginary line corresponding to the contour line of the opening of the through hole in the glass sheet, and the tapered through hole is finished through the subsequent etching treatment. Thus, as compared to the case of continuous irradiation with the laser along the imaginary line corresponding to the contour line of the opening of the through hole, a laser irradiation time can be shortened, and the simplification of work and a reduction in manufacturing cost are achieved.

In the above-mentioned method, the etching treatment for the glass sheet for forming the through hole gradually widened toward only one side of the sheet thickness direction may comprise placing a mask only on the principal surface of the glass sheet on one side.

With such configuration, dissolution and erosion by etching proceed from the principal surface side of the glass sheet on the opposite side to the principal surface having the mask placed thereon. Accordingly, the tapered through hole gradually widened toward only one side of the sheet thickness direction (toward the principal surface on the opposite side to the principal surface having the mask placed thereon) can be simply and accurately formed in the glass sheet.

In the above-mentioned method, a sheet thickness T0 of the glass sheet may be from 30 μm to 1,300 μm, the inclination angle θ of the inner wall surface of the through hole with respect to the sheet thickness direction may be from 2° to 45°, the minimum hole width D of the through hole may be from 5 μm to 200 μm, and the allowable variation range A of the minimum hole width D may be from 2% to 40% of the minimum hole width D. As used herein, the above-mentioned term "sheet thickness T0 of the glass sheet" refers to the design sheet thickness of the glass sheet.

With such configuration, a tapered through hole improved in dimensional accuracy can be more reliably formed in the glass sheet.

According to a second aspect of the present invention, which has been devised to achieve the above-mentioned object, there is provided a glass sheet for forming a through hole gradually widened toward at least one side of a sheet thickness direction, the through hole having an inclination angle α of an inner wall surface thereof with respect to a sheet thickness direction of from 2° to 45° and a minimum hole width "d" of from 5 μm to 200 μm, wherein, under conditions of: a sheet thickness t0 being from 30 μm to 1,300 μm; an allowable variation range of the minimum hole width "d" being represented by a % of the minimum hole width "d"; and "a" being from 2% to 40%, when the through hole is gradually widened toward only one side of the sheet thickness direction, a sheet thickness variation range Δt of the glass sheet satisfies the following relationship: Δt≤(d× a/tan α)/200, or when the through hole is gradually widened from a middle portion in the sheet thickness direction toward both of one side and another side of the sheet thickness direction, the sheet thickness variation range Δt of the glass sheet satisfies the following relationship: Δt≤(d×a/tan α)/100. As used herein, the above-mentioned term "allowable variation range of the minimum hole width "d"" means an allowable difference between the maximum value and the minimum value for the minimum hole width "d". In addition, the above-mentioned term "sheet thickness variation range" means a difference between the maximum value and the minimum value of the sheet thickness. Further, the above-mentioned sheet thickness t0, inclination angle α, and minimum hole width "d" are each a design value (value predetermined for the formation of the through hole).

According to such configuration, irrespective of which of the above-mentioned two kinds the form of the through hole is, the sheet thickness variation range Δt of the glass sheet falls within a predetermined range based on the inclination angle α of the inner wall surface of the through hole with respect to the sheet thickness direction, the minimum hole width "d" of the through hole, and the allowable variation range "a" of the minimum hole width "d". Accordingly, the variation in sheet thickness of the glass sheet is suppressed from adversely affecting the dimensional accuracy of the tapered through hole (in particular, the dimensional accuracy of the minimum hole width "d"). As a result, a tapered through hole improved in dimensional accuracy can be formed in the glass sheet.

According to a third aspect of the present invention, which has been devised to achieve the above-mentioned object, there is provided a glass sheet assembly, which is an assembly of a plurality of glass sheets for each of which the sheet thickness variation range Δt satisfies any one of the relationships.

According to such glass sheet assembly, the variation in sheet thickness among the plurality of glass sheets can be properly suppressed, to thereby form a tapered through hole improved in dimensional accuracy in each of the plurality of glass sheets.

Advantageous Effects of Invention

According to the present invention, the tapered through hole improved in dimensional accuracy can be formed in the glass sheet.

DESCRIPTION OF EMBODIMENTS

Embodiments of the present invention are described below with reference to the attached drawings.
[Method of Manufacturing Glass Sheet]

Figure 1:
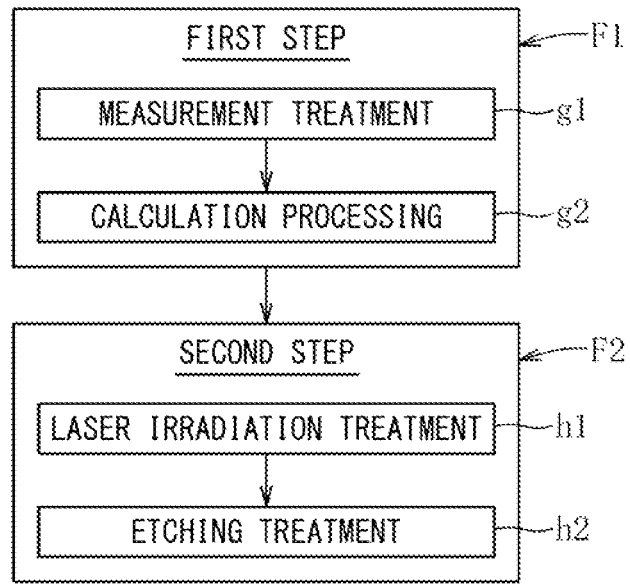
FIG. 1 is a flowchart for illustrating the steps of a method of manufacturing a glass sheet according to an embodiment of the present invention.

FIG. 1 is a flowchart for illustrating the steps of a method of manufacturing a glass sheet according to a first embodiment of the present invention. As illustrated in FIG. 1, the method of manufacturing a glass sheet comprises a first step F1 of preparing a glass sheet 1, and a second step F2 of forming a tapered through hole in the glass sheet 1. In the first step F1, measurement treatment g1 comprising measuring the sheet thickness of the glass sheet 1, and calculation processing g2 comprising performing calculation for determining conditions required of the glass sheet 1 are performed. Then, the glass sheet 1 to be prepared in the first step F1 is selected on the basis of the results of the measurement treatment g1 and the calculation processing g2.

Herein, the size of the glass sheet 1 is, for example, from 50 mm to 2,200 mm in its longitudinal dimension, and from 50 mm to 2,500 mm in its lateral dimension. In addition, soda glass, quartz glass, alkali-free glass, borosilicate glass, aluminosilicate glass, crystallized glass, or the like may be used as a material for the glass sheet 1. When the glass sheet 1 is to be used as a substrate for an electronic device, the material is preferably quartz glass, or alkali-free glass or borosilicate glass.

In the measurement treatment g1, measured sheet thicknesses T at a plurality of measurement points on the glass sheet 1 are measured by utilizing an ultrasonic wave, a laser, or the like. The measurement is performed with the measurement points being, for example, a plurality of sites (e.g., several tens of sites or several hundreds of sites) at a pitch of 1 mm in each of the longitudinal and lateral directions of a principal surface of the glass sheet 1. In addition, the variation range of the plurality of measured sheet thicknesses T is represented by $\Delta T$. As used herein, the term "variation range $\Delta T$" means a difference between the maximum value and the minimum value of the measured sheet thicknesses T. In the calculation processing g2, calculation is performed on the basis of various elements of the glass sheet 1 having a design sheet thickness T0 illustrated in each of FIG. 2 to FIG. 5. FIG. 2 to FIG. 5 exemplify a design through hole 2 to be formed in the glass sheet 1 in the second step F2. A plurality of through holes including the through hole 2 and a through hole identical thereto in size and shape are formed in one glass sheet 1 (not shown).

In the calculation in the calculation processing g2, the inclination angle of an inner wall surface 2a of the through hole 2 illustrated in each of FIG. 2 to FIG. 5 with respect to the sheet thickness direction (strictly speaking, an angle formed between a surface 3 perpendicular to each of principal surfaces 1a and 1b, and the inner wall surface 2a) is represented by $\theta$, the minimum hole width of the through hole 2 is represented by D, and the allowable variation range of the minimum hole width D is represented by A % of the minimum hole width D. The "variation range" in this case means an allowable difference between the maximum value and the minimum value for the minimum hole width D. A numerical value of the A % is set by one who carries out the manufacturing method according to this embodiment, such as a glass sheet manufacturer or a worker.

Under such settings, when the through hole 2 is gradually widened toward only one side of the sheet thickness direction, the glass sheet 1 for which the sheet thickness variation range $\Delta T$ satisfies the following relationship (hereinafter referred to as mathematical formula 1) is selected:

$$\Delta T \leq (D \times A / \tan \theta)/200$$

, or when the through hole 2 is gradually widened from a middle portion in the sheet thickness direction toward both of one side and the other side of the sheet thickness direction, the glass sheet 1 for which the sheet thickness variation range $\Delta T$ satisfies the following relationship (hereinafter referred to as mathematical formula 2) is selected:

$$\Delta T \leq (D \times A / \tan \theta)/100.$$

The above-mentioned mathematical formula 1 and mathematical formula 2 each show a relationship between the variation range of the minimum hole width D along the sheet thickness direction obtained through conversion from the variation range thereof along the width direction, and the variation range $\Delta T$ of the sheet thickness (measured sheet thicknesses T) of the glass sheet 1.

Herein, for the minimum hole width D of the through hole 2 of the mode illustrated in each of FIG. 2 to FIG. 5, a numerical value is set within the range of from 2 μm to 100 μm, or more than 100 μm and 200 μm or less, and the numerical value is substituted into the mathematical formula 1.

Figure 2:
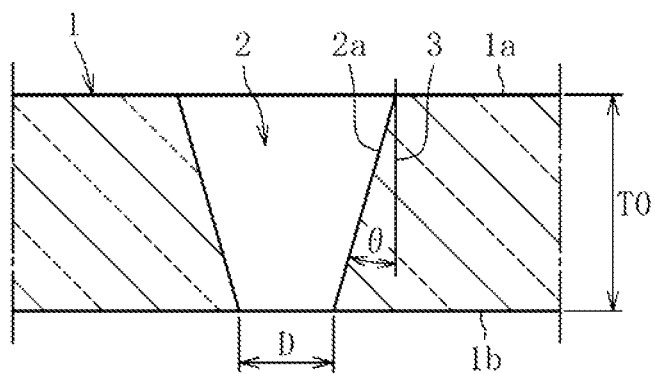
FIG. 2 is a vertical sectional front view for illustrating a first example of a glass sheet with a through hole to be manufactured by the method of manufacturing a glass sheet according to the embodiment of the present invention.
Figure 3:
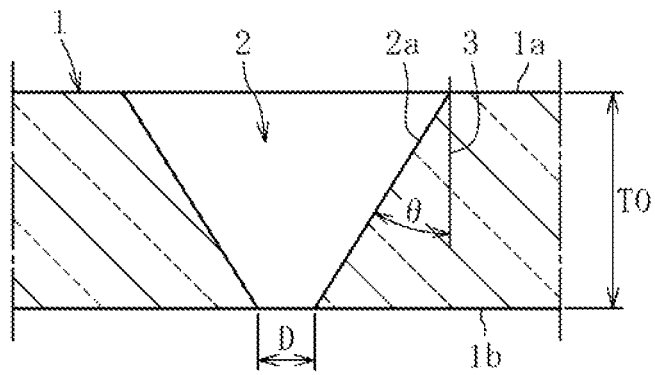
FIG. 3 is a vertical sectional front view for illustrating a second example of the glass sheet with a through hole to be manufactured by the method of manufacturing a glass sheet according to the embodiment of the present invention.

The through hole 2 illustrated in FIG. 2 is gradually widened toward only one side of the sheet thickness direction, and the inclination angle $\theta$ of the inner wall surface 2a thereof is from 2° to 45°, particularly from 3° to 35°. As an alternative, as illustrated in FIG. 3, the inclination angle $\theta$ of the inner wall surface 2a of the through hole 2 of this kind may be more than 35° and less than 60°. A numerical value of the inclination angle $\theta$ is set so as to fall within such ranges, and the numerical value is substituted into the mathematical formula 1.

In the case of the through hole 2 of this kind, while the allowable variation range A of the minimum hole width D is set to from 2% to 40% of the minimum hole width D, a numerical value of the percentage is set, and the numerical value is substituted into the mathematical formula 1. In this case, as the inclination angle $\theta$ increases, the variation in the minimum hole width D increases. Accordingly, while, when the inclination angle $\theta$ is large and the minimum hole width D is small, the allowable variation range A is set to be relatively small, for example, from 2% to 30% of the minimum hole width D, or when the inclination angle $\theta$ is small and the minimum hole width D is large, the allowable variation range A is set to be relatively large, for example, more than 30% and 40% or less of the minimum hole width D, a numerical value of the percentage is set, and the numerical value is substituted into the mathematical formula 1.

Figure 4:
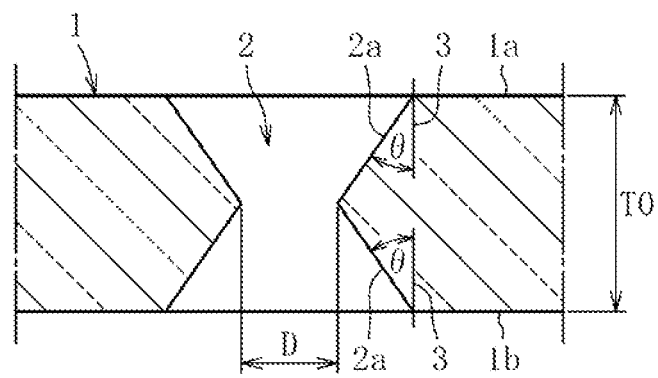
FIG. 4 is a vertical sectional front view for illustrating a third example of the glass sheet with a through hole to be manufactured by the method of manufacturing a glass sheet according to the embodiment of the present invention.
Figure 5:
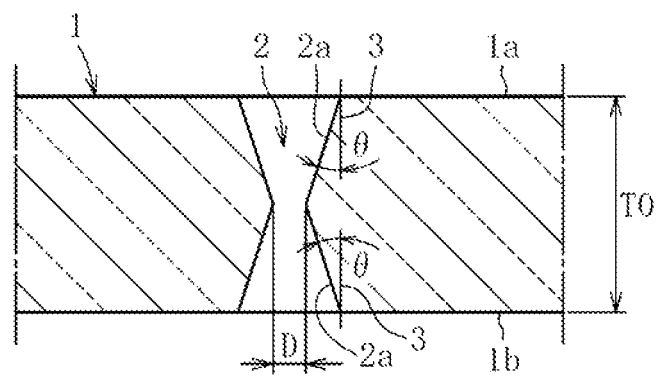
FIG. 5 is a vertical sectional front view for illustrating a fourth example of the glass sheet with a through hole to be manufactured by the method of manufacturing a glass sheet according to the embodiment of the present invention.

The through hole 2 illustrated in FIG. 4 is gradually widened from a middle portion in the sheet thickness direction (center in the sheet thickness direction) toward both of one side and the other side of the sheet thickness direction, and the inclination angle θ of the inner wall surface 2a thereof is from 2° to 45°, particularly from 3° to 35°. As an alternative, as illustrated in FIG. 5, the inclination angle θ of the inner wall surface 2a of the through hole 2 of this kind may be 2° or more and less than 10°. A numerical value of the inclination angle θ is set so as to fall within such ranges, and the numerical value is substituted into the mathematical formula 2. Also in this case, while the allowable variation range A of the minimum hole width D is set to from 2% to 40% of the minimum hole width D, a numerical value of the percentage is set, and the numerical value is substituted into the mathematical formula 2. Also in the case of the through hole 2 of this kind, as the inclination angle θ increases, the variation in the minimum hole width D increases. Accordingly, while, when the inclination angle θ is large and the minimum hole width D is small, the allowable variation range A is set to be relatively small, or when the inclination angle θ is small and the minimum hole width D is large, the allowable variation range A is set to be relatively large, a numerical value of the percentage is set, and the numerical value is substituted into the mathematical formula 2.

In the case of the through hole 2 of the form illustrated in each of FIG. 2 and FIG. 3, the variation in the minimum hole width D becomes larger than in the case of the through hole 2 of the form illustrated in each of FIG. 4 and FIG. 5. Accordingly, it is preferred that, in the case of the through hole 2 of the form illustrated in each of FIG. 2 and FIG. 3, the allowable variation range A of the minimum hole width D be set to be relatively small, and in the case of the through hole 2 of the form illustrated in each of FIG. 4 and FIG. 5, the allowable variation range A of the minimum hole width D be set to be relatively large.

The through hole 2 exemplified in each of FIG. 4 and FIG. 5 is gradually widened from the center in the sheet thickness direction toward both of one side and the other side of the sheet thickness direction, but may be gradually widened from the middle portion in the sheet thickness direction, which may not be the center in the sheet thickness direction, toward both of one side and the other side of the sheet thickness direction. In this case, with the middle portion being defined as a region away from one end of the sheet thickness direction (one principal surface 1a) by ⅓ or more of the sheet thickness toward the central side and away from the other end of the sheet thickness direction (other principal surface 1b) by ⅓ or more of the sheet thickness toward the central side, it may be appropriate to use the mathematical formula 2 for the through hole 2 that is gradually widened from a location in the region toward both of one side and the other side of the sheet thickness direction, and to use the mathematical formula 1 for the through hole 2 that is gradually widened from a location outside the region toward both of one side and the other side of the sheet thickness direction.

The design sheet thickness T0 of the glass sheet 1 illustrated in each of FIG. 2 to FIG. 5 is preferably from 30 μm to 1,300 μm, more preferably from 30 μm to 500 μm, or more than 500 μm and 1,300 μm or less. In the case of forming the through hole 2 in the glass sheet 1 having a large design sheet thickness T0, the variation in the minimum hole width D becomes larger than in the case of forming the through hole 2 in the glass sheet 1 having a small design sheet thickness T0. Accordingly, it is preferred that, in the case of forming the through hole 2 in the glass sheet 1 having a large design sheet thickness T0, the allowable variation range A of the minimum hole width D be set to be relatively small, and in the case of forming the through hole 2 in the glass sheet 1 having a small design sheet thickness T0, the allowable variation range A of the minimum hole width D be set to be relatively large.

In the first step F1, various design numerical values are substituted into the mathematical formula 1 or the mathematical formula 2 as described above, and a plurality of such glass sheets 1 that the variation range ΔT of the measured sheet thicknesses T of each of the glass sheets 1 satisfies the relationship of the mathematical formula 1 or the mathematical formula 2 are selected. Any one of the measurement treatment g1 and the calculation processing g2 may be performed first, or both may be performed in parallel. Thus, the preparation work for the glass sheets 1 in the first step F1 is completed.

The method of manufacturing a glass sheet according to the first embodiment exhibits such an action and effect as described below by virtue of performing the above-mentioned first step F1. That is, for each of the glass sheets 1 selected in the first step F1, the sheet thickness variation range ΔT falls within a predetermined range based on the inclination angle θ of the inner wall surface 2a of the through hole 2 with respect to the sheet thickness direction, the minimum hole width D of the through hole 2, and the allowable variation range A of the minimum hole width D. Accordingly, the variation in sheet thickness of the glass sheet 1 is suppressed from adversely affecting the dimensional accuracy of each of a plurality of the through holes 2 (in particular, the dimensional accuracy of the minimum hole width D). Besides, the variation range ΔT for all of the plurality of glass sheets 1 prepared falls within the above-mentioned predetermined range, and hence the variation in sheet thickness among the plurality of the glass sheets 1 can be properly suppressed. As a result, in the second step F2 (details are described later), the through holes 2 each improved in dimensional accuracy can be formed in each of the plurality of glass sheets 1. When the variation range ΔT of the measured sheet thicknesses T is less than 1 μm of the design sheet thickness T0, the principal surfaces 1a and 1b of the glass sheet 1 need to be finished by ultra-precise polishing, resulting in a rise in cost. For this reason, the lower limit value of ΔT is preferably T0/500.

Next, the second step F2 of the method of manufacturing a glass sheet according to the first embodiment is described. In the second step F2, as illustrated in FIG. 1, laser irradiation treatment h1 for the glass sheet 1, and etching treatment h2 for the glass sheet 1 subjected to the laser irradiation treatment h1 are performed.

Figure 6:
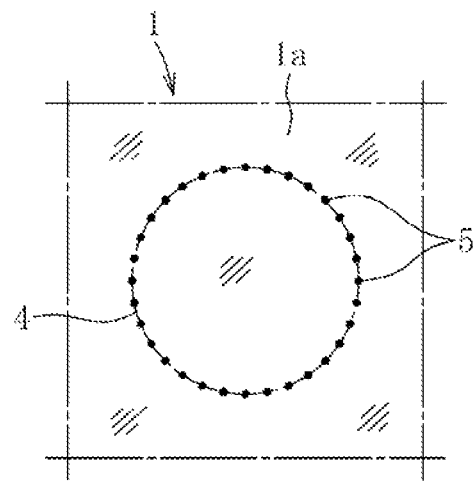
FIG. 6 is a plan view of a glass sheet, for illustrating an implementation setting of the second step of the method of manufacturing a glass sheet according to the embodiment of the present invention.

In the laser irradiation treatment h1, the glass sheet 1 prepared as described above is irradiated with a laser to form an irradiation-treated region. Specifically, as illustrated in FIG. 6, a plurality of mutually separated points 5 on an imaginary line 4 corresponding to the contour line of the opening of the through hole 2 on the one principal surface 1a of the glass sheet 1 are irradiated with a laser to form an irradiation-treated region at each of the plurality of sites. The irradiation-treated regions formed at the plurality of sites may be connected to each other, or may not be connected to each other. In this case, when the through hole 2 having an opening of a circular shape is to be formed, it is appropriate to intermittently radiate the laser on the imaginary line 4 of a circular shape as illustrated in FIG. 6, and when the through hole 2 having an opening of a rectangular shape (specifically a rectangular shape having curved corner portions) is to be formed, it is appropriate to intermittently radiate the laser on an imaginary line of a rectangular shape.

The irradiation-treated regions are preferably modified regions where a hole penetrating through the glass sheet 1 is not formed through the irradiation with the laser, but the irradiation with the laser may cause the formation of a penetrating hole. The laser to be used in this case is, for example, a $CO_2$ laser, a CO laser, an excimer laser, a YAG laser, a $YVO$ laser, or a fiber laser, and an ultraviolet region, a visible light region, and an infrared region are each applicable to its wavelength. When the irradiation-treated regions are the modified regions, a laser having a wavelength with a property of being transmitted through glass is preferred. In addition, an irradiation method is preferably intermittent pulsed irradiation.

Next, the glass sheet 1 having such irradiation-treated regions as described above is subjected to the etching treatment h2. Specifically, the glass sheet 1 is subjected to wet etching treatment by being immersed in an etchant, to thereby remove the irradiation-treated regions from the glass sheet 1. Thus, a plurality of the through holes 2 are formed in the glass sheet 1. Here, when, as illustrated in each of FIG. 2 and FIG. 3, the through hole 2 that is gradually widened toward only one side of the sheet thickness direction is to be formed in the glass sheet 1, the irradiation-treated regions are formed by irradiating the glass sheet 1 with the laser from only the one principal surface 1a side thereof. After that, a film, such as a resin film, is bonded to the other principal surface 1b to mask the other principal surface 1b, and under such state, the glass sheet 1 is subjected to wet etching treatment. Consequently, dissolution and erosion proceed from only the one principal surface 1a side of the glass sheet 1, and thus the tapered through hole 2 as illustrated in each of FIG. 2 and FIG. 3 is completed. The formation of the irradiation-treated regions in this case may be performed by irradiating the glass sheet 1 with the laser from both sides thereof, i.e., the one principal surface 1a side and the other principal surface 1b side.

Meanwhile, when, as illustrated in each of FIG. 4 and FIG. 5, the through hole 2 that is gradually widened from the middle portion in the sheet thickness direction toward both sides is to be formed in the glass sheet 1, the irradiation-treated regions are formed by irradiating the glass sheet 1 with the laser from both sides thereof, i.e., the one principal surface 1a side and the other principal surface 1b side, and then wet etching treatment is performed without masking. Consequently, dissolution and erosion proceed from both sides of the glass sheet 1, i.e., the one principal surface 1a side and the other principal surface 1b side, and thus the tapered through hole 2 as illustrated in each of FIG. 4 and FIG. 5 is completed. The formation of the irradiation-treated regions in this case may also be performed by radiating the laser from only any one of the principal surface 1a and 1b sides. In the second step F2, the through hole 2 may be formed in the glass sheet 1 by performing only continuous irradiation with the laser along the imaginary line 4 without performing the etching treatment h2.

The glass sheet 1 to be used for forming the through holes 2 in the second step F2 is selected in the first step F1 as a glass sheet that satisfies the relationship of the mathematical formula 1 or the mathematical formula 2. Accordingly, a plurality of the through holes 2 formed in the glass sheet 1 are each improved in dimensional accuracy (in particular, dimensional accuracy of the minimum hole width D).

[Glass Sheet]

A second embodiment of the present invention relates to a glass sheet. The glass sheet is used for forming a through hole gradually widened toward at least one side of a sheet thickness direction. A sheet thickness t0 of the glass sheet is from 30 μm to 1,300 μm. In addition, the through hole that is formed in the glass sheet has an inclination angle α of its inner wall surface with respect to the sheet thickness direction of from 2° to 45°, and a minimum hole width "d" of from 5 μm to 200 μm. Further, an allowable variation range a % of the minimum hole width "d" is from 2% to 40% of the minimum hole width "d".

Under such conditions, when the through hole 2 is gradually widened toward only one side of the sheet thickness direction, a sheet thickness (measured sheet thickness t) variation range Δt satisfies the following relationship:

$$\Delta t \le (d \times a / \tan \alpha)/200$$

, or when the through hole 2 is gradually widened from a middle portion in the sheet thickness direction toward both of one side and the other side of the sheet thickness direction, the sheet thickness (measured sheet thickness t) variation range Δt satisfies the following relationship:

Δt≤(d×a/tan α)/100. The above-mentioned sheet thickness t0, inclination angle α, and minimum hole width "d" are each a design value.

A plurality of through holes are formed also in this glass sheet, and these through holes each assume such mode as illustrated in any one of FIG. 2 to FIG. 5. Accordingly, when the sheet thickness t0, the inclination angle α, the minimum hole width "d", the allowable variation range "a" thereof, and the sheet thickness variation range Δt, and the measured sheet thicknesses in this embodiment are replaced by the above-mentioned inclination angle θ, minimum hole width D, allowable variation range A thereof, and sheet thickness variation range ΔT, and measured sheet thicknesses T, respectively, the matters already described in [Method of Manufacturing Glass Sheet] according to the first embodiment apply to the glass sheet according to the second embodiment.

Also in the case of this glass sheet, the sheet thickness variation range Δt falls within a predetermined range based on the inclination angle α of the inner wall surface of the through hole with respect to the sheet thickness direction, the minimum hole width "d" of the through hole, and the allowable variation range "a" of the minimum hole width "d". Accordingly, the variation in sheet thickness of the glass sheet is suppressed from adversely affecting the dimensional accuracy of each of a plurality of through holes (in particular, the dimensional accuracy of the minimum hole width "d"). As a result, a plurality of through holes each improved in dimensional accuracy can be formed in the glass sheet. Also in the case of this glass sheet, when the variation range Δt of the measured sheet thicknesses "t" is less than 1 μm of the design sheet thickness t0, its principal surfaces need to be finished by ultra-precise polishing, possibly resulting in a rise in cost. For this reason, the lower limit value of Δt is preferably t0/500.

In addition, a glass sheet assembly may be obtained by assembling a plurality of such glass sheets. According to the glass sheet assembly, the variation in sheet thickness among the plurality of glass sheets is suppressed, and moreover, a through hole improved in dimensional accuracy can be formed in each of the plurality of glass sheets.

EXAMPLES

Example 1

Examples for the foregoing [Method of Manufacturing Glass Sheet] are described below. Examples for the foregoing [Glass Sheet] are in common with Examples for [Method of Manufacturing Glass Sheet] described herein. Accordingly, in the following, a description is made by replacing the inclination angle α, the minimum hole width "d", the variation range "a" thereof, and the sheet thickness variation range Δt, and the measured sheet thicknesses "t" for [Glass Sheet] with the inclination angle θ, the minimum hole width D, the variation range A thereof, and the sheet thickness variation range ΔT, and the measured sheet thicknesses T for [Method of Manufacturing Glass Sheet], respectively.

In Example 1, the through hole 2 of such mode as illustrated in FIG. 2 is formed. Specifically, as shown in Table 1 below, the calculated value of ΔT according to the mathematical formula 1 (upper limit value of ΔT) was 11.5 μm in the following case: the sheet thickness T0 (design sheet thickness) of a glass sheet was 100 μm; the inclination angle θ of the inner wall surface 2a of the through hole 2 was set to 9.9°; the minimum hole width D of the through hole 2 (having an opening of a circular shape) was set to 20 μm; and the allowable variation range A of the minimum hole width D was set to 20%. In view of this, a glass sheet for which a specific numerical value ΔT1 of the variation range of its sheet thickness (measured sheet thicknesses T) was 9 μm (minimum value: 97 μm, maximum value: 106 μm) was prepared. A material for the glass sheet is alkali-free glass. The through hole 2 was formed in the glass sheet through only laser irradiation. As a result, minimum hole widths D1 of a plurality of the through holes 2 formed in the glass sheet had a minimum value of 19.0 μm and a maximum value of 22.1 μm, and a variation range ΔD1 of the minimum hole widths D1 was 15.5% (3.1 μm). It was recognized from the results that the glass sheet had formed therein a plurality of through holes each improved in dimensional accuracy (in particular, dimensional accuracy of the minimum hole width D1).

TABLE 1

| | |
|---|---|
| Sheet thickness T0 | 100 μm |
| Inclination angle θ | 9.9° |
| Minimum hole width D | 20 μm |
| Allowable error A | 20% |
| Calculated value of ΔT | 11.5 μm |
| Sheet thickness variation ΔT1 | 9 μm (97 μm to 106 μm) |
| Glass material | Alkali-free glass |
| Processing method | Laser only |
| Result: minimum hole width D1 | 19.0 μm to 22.1 μm |
| Result: variation ΔD1 in D1 | 15.5% |

Also in Example 2, the through hole 2 of such mode as illustrated in FIG. 2 is formed. Specifically, as shown in Table 2 below, the calculated value of ΔT according to the mathematical formula 1 (upper limit value of ΔT) was 15.0 μm in the following case: the sheet thickness T0 of a glass sheet was 300 μm; the inclination angle θ of the inner wall surface 2a of the through hole 2 was set to 11.3°; the minimum hole width D of the through hole 2 was set to 30 μm; and the allowable variation range A of the minimum hole width D was set to 20%. In view of this, a glass sheet for which a specific numerical value ΔT1 of the variation range of its sheet thickness (measured sheet thicknesses T) was 13 μm (minimum value: 292 μm, maximum value: 305 μm) was prepared. A material for the glass sheet is soda glass. The through hole 2 was formed in the glass sheet by forming an irradiation-treated region having a penetrating hole through laser irradiation, and then performing etching treatment. As a result, the minimum hole widths D1 of a plurality of the through holes 2 formed in the glass sheet had a minimum value of 26.8 μm and a maximum value of 32.0 μm, and the variation range ΔD1 of the minimum hole widths D1 was 17.3% (5.2 μm). It was recognized from the results that the glass sheet had formed therein a plurality of through holes each improved in dimensional accuracy (in particular, dimensional accuracy of the minimum hole width D1).

TABLE 2

| | |
|---|---|
| Sheet thickness T0 | 300 μm |
| Inclination angle θ | 11.3° |
| Minimum hole width D | 30 μm |
| Allowable error A | 20% |
| Calculated value of ΔT | 15.0 μm |
| Sheet thickness variation ΔT1 | 13 μm (292 μm to 305 μm) |
| Glass material | Soda glass |
| Processing method | Laser penetration + etching |
| Result: minimum hole width D1 | 26.8 μm to 32.0 μm |
| Result: variation ΔD1 in D1 | 17.3% |

In Example 3, the through hole 2 of such mode as illustrated in FIG. 3 is formed. Specifically, as shown in Table 3 below, the calculated value of ΔT according to the mathematical formula 1 (upper limit value of ΔT) was 2.9 μm in the following case: the sheet thickness T0 of a glass sheet was 50 μm; the inclination angle θ of the inner wall surface 2a of the through hole 2 was set to 35'; the minimum hole width D of the through hole 2 was set to 10 μm; and the allowable variation range A of the minimum hole width D was set to 40%. In view of this, a glass sheet for which the specific numerical value ΔT1 of the variation range of its sheet thickness (measured sheet thicknesses T) was 2.5 μm (minimum value: 48.5 μm, maximum value: 51 μm) was prepared. A material for the glass sheet is alkali-free glass. The through hole 2 was formed in the glass sheet by forming a non-penetrating modified region through laser irradiation, and then performing etching treatment. As a result, the minimum hole widths D1 of a plurality of the through holes 2 formed in the glass sheet had a minimum value of 7.9 μm and a maximum value of 11.4 μm, and the variation range ΔD1 of the minimum hole width D1 was 35.0% (3.5 μm). It was recognized from the results that the glass sheet had formed therein a plurality of through holes each improved in dimensional accuracy (in particular, dimensional accuracy of the minimum hole width D1).

TABLE 3

| | |
|---|---|
| Sheet thickness T0 | 50 μm |
| Inclination angle θ | 35° |
| Minimum hole width D | 10 μm |
| Allowable error A | 40% |
| Calculated value of ΔT | 2.9 μm |
| Sheet thickness variation ΔT1 | 2.5 μm (48.5 μm to 51 μm) |
| Glass material | Alkali-free glass |
| Processing method | Laser modification + etching |
| Result: minimum hole width D1 | 7.9 μm to 11.4 μm |
| Result: variation ΔD1 in D1 | 35.0% |

In Example 4, the through hole 2 of such mode as illustrated in FIG. 4 is formed. Specifically, as shown in Table 4 below, the calculated value of ΔT according to the mathematical formula 2 (upper limit value of ΔT) was 24.1 µm in the following case: the sheet thickness T0 of a glass sheet was 100 µm; the inclination angle θ of the inner wall surface 2a of the through hole 2 was set to 14°; the minimum hole width D of the through hole 2 was set to 30 µm; and the allowable variation range A of the minimum hole width D was set to 20%. In view of this, a glass sheet for which the specific numerical value ΔT1 of the variation range of its sheet thickness (measured sheet thicknesses T) was 22 µm (minimum value: 89 µm, maximum value: 111 µm) was prepared. A material for the glass sheet is alkali-free glass. The through hole 2 was formed in the glass sheet by forming a non-penetrating modified region through laser irradiation, and then performing etching treatment. As a result, the minimum hole widths D1 of a plurality of the through holes 2 formed in the glass sheet had a minimum value of 27.3 µm and a maximum value of 32.7 µm, and the variation range ΔD1 of the minimum hole width D1 was 18.0% (5.4 µm). It was recognized from the results that the glass sheet had formed therein a plurality of through holes each improved in dimensional accuracy (in particular, dimensional accuracy of the minimum hole width D1).

TABLE 4

| | |
|---|---|
| Sheet thickness T0 | 100 µm |
| Inclination angle θ | 14° |
| Minimum hole width D | 30 µm |
| Allowable error A | 20% |
| Calculated value of ΔT | 24.1 µm |
| Sheet thickness variation ΔT1 | 22 µm (89 µm to 111 µm) |
| Glass material | Alkali-free glass |
| Processing method | Laser modification + etching |
| Result: minimum hole width D1 | 27.3 µm to 32.7 µm |
| Result: variation ΔD1 in D1 | 18.0% |

In Example 5, the through hole 2 of such mode as illustrated in FIG. 5 is formed. Specifically, as shown in Table 5 below, the calculated value of ΔT according to the mathematical formula 2 (upper limit value of ΔT) was 92.4 µm in the following case: the sheet thickness T0 of a glass sheet was 500 µm; the inclination angle θ of the inner wall surface 2a of the through hole 2 was set to 5.1°; the minimum hole width D of the through hole 2 was set to 55 µm; and the allowable variation range A of the minimum hole width D was set to 15%. In view of this, a glass sheet for which the specific numerical value ΔT1 of the variation range of its sheet thickness (measured sheet thicknesses T) was 85 µm (minimum value: 457 µm, maximum value: 542 µm) was prepared. A material for the glass sheet is quartz glass. The through hole 2 was formed in the glass sheet by forming an irradiation-treated region having a penetrating hole through laser irradiation, and then performing etching treatment. As a result, the minimum hole widths D1 of a plurality of the through holes 2 formed in the glass sheet had a minimum value of 51.2 µm and a maximum value of 58.7 µm, and the variation range ΔD1 of the minimum hole width D1 was 13.6% (7.5 µm). It was recognized from the results that the glass sheet had formed therein a plurality of through holes each improved in dimensional accuracy (in particular, dimensional accuracy of the minimum hole width D1).

TABLE 5

| | |
|---|---|
| Sheet thickness T0 | 500 µm |
| Inclination angle θ | 5.1° |
| Minimum hole width D | 55 µm |
| Allowable error A | 15% |
| Calculated value of ΔT | 92.4 µm |
| Sheet thickness variation ΔT1 | 85 µm (457 µm to 542 µm) |
| Glass material | Quartz glass |
| Processing method | Laser penetration + etching |
| Result: minimum hole width D1 | 51.2 µm to 58.7 µm |
| Result: variation ΔD1 in D1 | 13.6% |

Also in Example 6, the through hole 2 of such mode as illustrated in FIG. 5 is formed. Specifically, as shown in Table 6 below, the calculated value of ΔT according to the mathematical formula 2 (upper limit value of ΔT) was 17.2 µm in the following case: the sheet thickness T0 of a glass sheet was 50 µm; the inclination angle θ of the inner wall surface 2a of the through hole 2 was set to 2'; the minimum hole width D of the through hole 2 was set to 20 µm; and the allowable variation range A of the minimum hole width D was set to 3%. In view of this, a glass sheet for which the specific numerical value ΔT1 of the variation range of its sheet thickness (measured sheet thicknesses T) was 14 µm (minimum value: 42 µm, maximum value: 56 µm) was prepared. A material for the glass sheet is borosilicate glass. The through hole 2 was formed in the glass sheet by forming a non-penetrating modified region through laser irradiation, and then performing etching treatment. As a result, the minimum hole widths D1 of a plurality of the through holes 2 formed in the glass sheet had a minimum value of 19.8 µm and a maximum value of 20.3 µm, and the variation range ΔD1 of the minimum hole width D1 was 2.5% (0.5 µm). It was recognized from the results that the glass sheet had formed therein a plurality of through holes each improved in dimensional accuracy (in particular, dimensional accuracy of the minimum hole width D1).

TABLE 6

| | |
|---|---|
| Sheet thickness T0 | 50 µm |
| Inclination angle θ | 2° |
| Minimum hole width D | 20 µm |
| Allowable error A | 3% |
| Calculated value of ΔT | 17.2 µm |
| Sheet thickness variation ΔT1 | 14 µm (42 µm to 56 µm) |
| Glass material | Borosilicate glass |
| Processing method | Laser modification + etching |
| Result: minimum hole width D1 | 19.8 µm to 20.3 µm |
| Result: variation ΔD1 in D1 | 2.5% |

REFERENCE SIGNS LIST 1 glass sheet
1a one principal surface
1b another principal surface
2 through hole
2a inner wall surface
4 imaginary line
5 plurality of points
F1 first step
F2 second step
A error
a error
D minimum hole width
d minimum hole width
g1 measurement treatment
g2 calculation processing h1 laser irradiation treatment
h2 etching treatment
T measured sheet thickness
t measured sheet thickness
T0 sheet thickness
t0 sheet thickness
T1 average sheet thickness
t1 average sheet thickness
θ inclination angle
α inclination angle
ΔT sheet thickness variation range
Δt sheet thickness variation range

The invention claimed is:

1. A method of manufacturing a glass sheet having a through hole, the method comprising:
a first step of preparing a glass sheet; and
a second step of forming, in the glass sheet, a through hole gradually widened toward at least one side of a sheet thickness direction,
wherein the first step comprises:
preparing a glass sheet for which a sheet thickness variation range ΔT of the glass sheet satisfies the following relationship when the through hole in the second step is gradually widened toward only one side of the sheet thickness direction:

$\Delta T \le (D \times A/\tan\theta)/200$, or preparing a glass sheet for which the sheet thickness variation range ΔT of the glass sheet satisfies the following relationship when the through hole in the second step is gradually widened from a middle portion in the sheet thickness direction toward both of one side and another side of the sheet thickness direction:

$\Delta T \le (D \times A/\tan\theta)/100$ provided that θ represents an inclination angle of an inner wall surface of the through hole with respect to the sheet thickness direction; D represents a minimum hole width of the through hole; and an allowable variation range of the minimum hole width D is represented by A % of the minimum hole width D.

2. The method of manufacturing a glass sheet according to claim 1, wherein the second step comprises forming a plurality of the through holes identical to each other in size and shape in the glass sheet for which the sheet thickness variation range ΔT satisfies any one of the relationships.

3. The method of manufacturing a glass sheet according to claim 1, wherein the first step comprises preparing a plurality of glass sheets for each of which the sheet thickness variation range ΔT satisfies any one of the relationships.

4. The method of manufacturing a glass sheet according to claim 1, wherein the second step comprises forming the through hole through laser irradiation treatment for a principal surface of the glass sheet, and etching treatment for the glass sheet after the laser irradiation treatment.

5. The method of manufacturing a glass sheet according to claim 4, wherein the forming of the through hole is performed by forming an irradiation-treated region in the glass sheet through the laser irradiation treatment, and removing the irradiation-treated region through the etching treatment.

6. The method of manufacturing a glass sheet according to claim 4, wherein the laser irradiation treatment comprises irradiating, with a laser, a plurality of mutually separated points on an imaginary line corresponding to a contour line of an opening of the through hole on the principal surface of the glass sheet.

7. The method of manufacturing a glass sheet according to claim 4, wherein the etching treatment for the glass sheet for forming the through hole gradually widened toward only the one side of the sheet thickness direction comprises placing a mask only on the principal surface of the glass sheet on one side.

8. The method of manufacturing a glass sheet according to claim 1, wherein a sheet thickness T0 of the glass sheet is from 30 μm to 1,300 μm.

9. The method of manufacturing a glass sheet according to claim 1, wherein the inclination angle θ of the inner wall surface of the through hole with respect to the sheet thickness direction is from 2° to 45°.

10. The method of manufacturing a glass sheet according to claim 1, wherein the minimum hole width D of the through hole is from 5 μm to 200 μm.

11. The method of manufacturing a glass sheet according to claim 1, wherein the allowable variation range A of the minimum hole width D is from 2% to 40% of the minimum hole width D.

12. A glass sheet for forming a through hole gradually widened toward at least one side of a sheet thickness direction, the through hole having an inclination angle α of an inner wall surface thereof with respect to a sheet thickness direction of from 2° to 45° and a minimum hole width "d" of from 5 μm to 200 μm,
wherein, under conditions of: a sheet thickness t0 being from 30 μm to 1,300 μm; an allowable variation range of the minimum hole width "d" being represented by a % of the minimum hole width "d"; and "a" being from 2% to 40%,
when the through hole is gradually widened toward only one side of the sheet thickness direction, a sheet thickness variation range Δt satisfies the following relationship:

$\Delta t \le (d \times a/\tan\alpha)/200$, or when the through hole is gradually widened from a middle portion in the sheet thickness direction toward both of one side and another side of the sheet thickness direction, the sheet thickness variation range Δt satisfies the following relationship:

$\Delta t \le (d \times a/\tan\alpha)/100$.

13. A glass sheet assembly, which is an assembly of a plurality of glass sheets for each of which the sheet thickness variation range Δt of claim 12 satisfies any one of the relationships.

* * * * *